United States Patent [19]

Cornelison

[11] Patent Number: 5,263,118
[45] Date of Patent: Nov. 16, 1993

[54] PARKING TICKET ENFORCEMENT SYSTEM

[75] Inventor: Brian N. Cornelison, Memphis, Tenn.

[73] Assignee: Applied Voice Technology, Inc., Memphis, Tenn.

[21] Appl. No.: 492,658

[22] Filed: Mar. 13, 1990

[51] Int. Cl.$^5$ .............................................. G10L 3/00
[52] U.S. Cl. ................................................... 395/2
[58] Field of Search ............... 395/2, 600; 381/41–45

[56] References Cited

U.S. PATENT DOCUMENTS

| | | | |
|---|---|---|---|
| 3,427,585 | 2/1969 | Milford | 235/163 |
| 3,866,165 | 2/1975 | Maronde et al. | 340/937 |
| 3,899,772 | 8/1975 | Mead et al. | 340/825.55 |
| 3,906,445 | 9/1975 | Beckmann et al. | 371/69.1 |
| 3,996,448 | 12/1976 | Anderson et al. | 235/419 |
| 4,072,850 | 2/1978 | McGlynn | 364/424.04 |
| 4,228,519 | 10/1980 | Pfeifer | 364/564 |
| 4,262,957 | 4/1981 | Wise et al. | 296/37.1 |
| 4,361,355 | 11/1982 | Wise et al. | 296/37.1 |
| 4,555,618 | 11/1985 | Riskin | 235/384 |
| 4,567,609 | 1/1986 | Metcalf | 382/9 |
| 4,603,390 | 7/1986 | Mahdipour et al. | 364/467 |
| 4,714,995 | 12/1987 | Materna et al. | 395/600 |
| 4,720,785 | 1/1988 | Shapiro | 364/401 |
| 4,774,571 | 9/1988 | Mahdipour et al. | 358/108 |
| 4,812,805 | 3/1989 | Lachat et al. | 340/825.05 |
| 4,975,957 | 12/1990 | Ichikawa et al. | 381/43 |
| 5,054,082 | 10/1991 | Smith et al. | 395/2 |

OTHER PUBLICATIONS

Fuchsberg, Gilbert, "Hand Held Computers Held Field Staff Cut Paper Work and Harvest More Data", *The Wall Street Journal*, Jan. 30, 1990.

*Primary Examiner*—David D. Knepper
*Attorney, Agent, or Firm*—Wood, Herron & Evans

[57] ABSTRACT

A system includes a base station computer with memory for storing a data file representative of vehicle license plate numbers and coded violation information associated with the numbers. A plurality of stand-alone computers are compatible with the base station computer and have separate memory capacity into which the data file may be transferred. Each stand-alone computer is equipped with voice-recognition circuitry for receipt and recognition of voiced communications from an enforcement officer via a hand-held unit. The voiced communication relates to a license plate number observed by the officer on duty. Upon receipt and recognition of a voiced signal by the respective stand-alone computer, the stand-alone computer searches the data file for unpaid violations by the observed number, and if any are detected, the officer is informed so that appropriate enforcement steps may be taken.

11 Claims, 3 Drawing Sheets

PARKING TICKET ENFORCEMENT SYSTEM

FIELD OF THE INVENTION

This invention relates to an automated parking ticket enforcement system which maintains an updated data file representative of a selected number of vehicle license plate numbers and coded violation information associated with each of the numbers. The data file is accessible to enforcement officers while on duty so that appropriate action can be taken against offenders for prior unpaid violations.

BACKGROUND OF THE INVENTION

It has been reported that, due to ineffective and/or inefficient collection, cities and municipalities across the country have lost large sums of money in terms of non-payment of tickets for parking and traffic violations. Many unpaid tickets remain unpaid because the time and costs associated with tracking down and collecting on these unpaid tickets has been considered excessive, and for the most part, not practical.

Towing and impounding of vehicles, or the use of other immobilization devices, such as a boot, have proved quite effective in enforcing collection of unpaid tickets. However, an officer must be able to readily identify the vehicles having outstanding, unpaid tickets in order to determine when these devices should be used. Typically, such identification is done by license plate numbers. Although many police departments keep records of license plate numbers, either in a paper file or stored in a computer, related to prior unpaid tickets of vehicles registered for a particular geographical area, it is extremely difficult to disseminate such information on a regular basis to officers on duty. Such difficulty means that revenues from unpaid parking tickets and other violations simply remain unrecovered and possible offenders will continue to escape detection.

In addition to revenue collection from traffic and/or parking violations, it is also desirable to provide a police officer on duty the capability of conveniently and effectively determining whether or not an observed vehicle has been associated with other criminal activity, either in that particular district or state, or in another geographical region of the country. This determination is particularly important in view of recent efforts to detect and enforce vehicles associated with illegal drug smuggling activity.

From the perspective of an enforcement officer, it is critical that any system used to provide updated license plate information must not impair the officer's ability to perform his or her normal duties in an efficient and in a safe manner. For instance, an officer on duty does not have time to page through a computer print-out to determine whether or not an observed violator has any uncollected, expired tickets, or whether the observed vehicle is a stolen vehicle or associated with other criminal activity. Typically, it takes about 45 seconds for an officer to write a ticket. Any system that demands significantly more time would be considered inefficient. Moreover, a system that requires the attention of an officer for too great a duration of time puts him or her in physical danger unless another officer is present.

SUMMARY OF THE INVENTION

The present invention provides a vehicle identification information system and method which facilitates quick and efficient dissemination of updated vehicle identification information to an officer while on duty, and which does so in a manner that does not significantly impair his or her normal duties or put the officer in danger.

The invention also provides an efficient and cost effective parking ticket enforcement method for receiving, processing and readily disseminating unpaid violation information to officers on duty without time-consuming delays or the need to flip through pages of vehicle license numbers on a list so that appropriate enforcement action may be promptly taken.

To this end, and in accordance with a preferred embodiment of the invention, a central station in radio communication with the officer in the field is provided with a stand-alone computer assigned to each officer wherein each computer includes a data file containing up-to-date vehicle identification information for real-time access by the officer in the field via radio communication.

This invention generally contemplates the utilization of two-way audible communication between a hand-held unit carried by an officer on duty and a periodically updated data file stored in memory in a stand-alone computer assigned to the officer, the stand-alone computer being equipped with voice recognition circuitry and software so that only voice signals transmitted from a recognized officer will be received and processed.

Because each stand-alone computer has a periodically updated data file stored in memory, an officer on duty has immediate access to an updated record of the unpaid violations or criminal activity associated with an observed license plate number. Moreover, because access to this information is provided via voice communication through a hand-held unit which may be the radio that an officer carries in the normal course of duty, the system does not significantly affect the officer's ability to perform normal duties in an efficient manner. Perhaps most importantly, from both an efficiency and a safety standpoint, the system does not in any way interrupt the officer's visual observation capability, or make excessive demands on his or her time.

In use, an officer audibly transmits an observed vehicle license plate number from the handheld unit to an assigned, stand-alone computer. The voice recognition circuitry in the computer receives, recognizes and stores the signal, then searches the data file to determine if there are any relevant violations or criminal activity information corresponding to the observed license plate. The stand-alone computer then generates a status message that corresponds to the violation status of the observed vehicle, i.e., whether or not the observed vehicle number has any prior unpaid violations. If the stand-alone computer is used by an officer in a vehicle, the status message may be displayed on a display associated therewith, and which is located in the vehicle. If the stand-alone computer is stationary and located at a precinct headquarters for example, the status message is transmitted to the officer's hand-held unit and then converted to an audible signal.

Periodically, updated information is input into the data file at a base station computer. This may be done through a modem, with the updated information coming from a mainframe computer owned, or contracted for, by the city. At the beginning of the next day, or the next shift, this updated data file is transferred, preferably via disk, from the base station computer memory to the memory of each of the stand-alone computers.

The system utilizes three components, the base station computer in which the data file is stored in memory, a plurality of stand-alone computers that each have memory and are compatible with the base station computer to permit transfer via disk of the data file therebetween, and a plurality of transceivers, or hand-held units, each associated with one of the stand-alone computers to permit two-way audible communication between an officer and his or her assigned stand-alone computer. Each stand-alone computer is also equipped with voice recognition circuitry to recognize the voice transmission of the officer assigned thereto. The "voice print" of an officer assigned to a particular stand-alone computer is loaded in with the date file, at the beginning of a shift. The base station computer is also equipped with voice recognition circuitry and hardware for enrolling or generating and storing a "voice print" of each officer.

To implement voice recognition, each officer must "enroll" by speaking a number of predetermined code words into a microphone, the code words being associated with numbers or letters of a license plate. From the spoken code words, the voice recognition circuitry stores a "voice print" which identifies particular characteristics unique to the speaker's voice. This "voice print" is then stored at the base station computer on a hard disk, and subsequently may be transferred to a stand-alone computer associated with a "beat" or duty route to which the officer has been assigned. Subsequently, when a voice signal is received by a stand-alone computer from an officer on duty, the characteristics of the received voice signal must first be recognized, or "match" those stored in memory before the signal can be compared with information in the data file.

As stated previously, the stand-alone computer may be located in an officer's vehicle, or if the officer is on foot patrol, the stand-alone computer may be placed within a building that is relatively close to the geographical area of the patrol, so that two-way radio transmission is possible. If the officer uses a vehicle, the status message generated for an observed license plate number will be displayed on a screen, rather than transmitted audibly.

If desired, the system 10 may also be used to enter information from the stand-alone computer to the base computer. This may be accomplished via transmission of coded violation information and a vehicle number from an officer to a stand-alone computer, the coded violation information relating to an observed vehicle and an offense/violation. The voice recognition circuitry then recognizes the voice and stores the violation information with the vehicle number in memory at the stand-alone computer. Subsequently, at the end of the shift, this information is downloaded into memory at the base station computer. With a plurality of officers using the system, the base computer is updated from a plurality of sources. Because this recently-entered information does not yet designate an overdue or unpaid violation, it could be stored in the base computer until it is "wiped out" or erased upon payment. If payment is not made on time, the information could be transferred to an "active" status and then disseminated to the officers, stand-alone computers for the next shift.

These and other features of the invention will be more readily understood in view of the detailed description and the drawings in which:

DETAILED DESCRIPTION OF THE DRAWINGS

Figure 1:
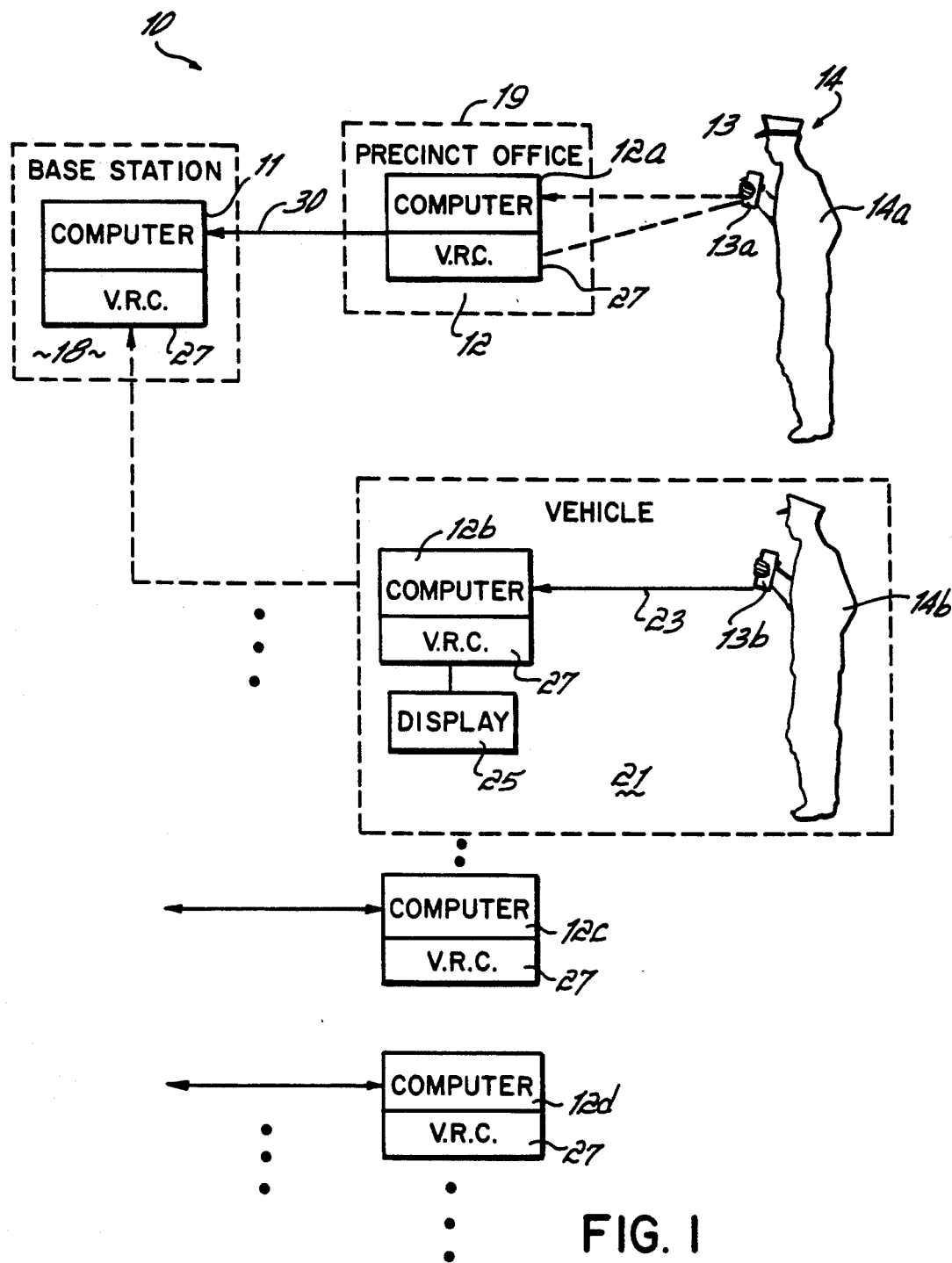
FIG. 1 is a schematic which depicts the components of a parking ticket enforcement system in accordance with a preferred embodiment of the invention.

FIG. 1 schematically shows a parking ticket enforcement system 10 in accordance with a preferred embodiment of the invention. Generally, the system 10 includes a base station computer 11 that is compatible with a plurality of stand-alone computers 12, each of which communicates with a hand-held unit 13 assigned to an enforcement officer 14. The base station computer 11 is located at a base station 18, which is preferably centrally located with respect to the geographical area serviced by the system 10.

The system 10 contemplates the use of a plurality of stand-alone computers 12, each of which may be utilized in either a stationary or a mobile environment. In FIG. 1, a stand-alone computer 12a is stationary, and is located in a precinct office 19 and in two-way radio communication with hand-held unit 13a carried by officer 14a. Hand-held unit 13a is a transceiver. Stand-alone computer 12b is mobile, and is located in a vehicle 21 occupied by officer 14b. Stand-alone computer 12b is connected by a cable 23 to hand-held unit 13b, which in the mobile use is simply a microphone. In the mobile environment, the stand-alone computer 12b also includes a display 25. Additional stand-alone computers 12c, 12d . . . etc. may be utilized in this system 10, either in a stationary or a mobile environment.

FIG. 1 also shows that base computer 11 and the stand-alone computers 12a, 12b . . . etc. each include voice recognition circuitry (VRC) 27, such as provided by Texas Instruments TI-Speech Hardware Kit, Part No. 2245187-0001. This kit includes a Speech-Board computer card, a microphone and a speaker. All these components are necessary at the base station computer 11 for enrollment of the officers into the voice recognition circuitry 27. However, it is not necessary to equip the stand-alone computers 12a with either the microphone or the speaker. In addition, it is not necessary to equip the mobile stand-alone computers 12b with the speaker.

The base station computer 11 for a client, i.e., a city or municipality, with less than 250,000 enforceable license plates preferably consists of an IBM XT or AT compatible personal computer running MS-DOS 3.0 (or greater) with 640K of RAM memory, a 40 megabyte hard disk drive, two 3.5 inch 1.44 megabyte floppy disk drives, a display monitor, keyboard, and printer (not shown). In addition, the base station computer 11 must be equipped with an expanded memory computer card which is compatible with the Lotus/-Intel/Microsoft Expanded Memory Specification Version 4.0. The cards must then have enough memory chips added to store all the license plate numbers that are desired. An example of this type of computer card is the Intel Above Board Plus memory expansion card. Multiple expansion cards would be necessary if more than 600,000 license plates are to be stored in the data file.

If the client wishes to communicate between the base station computer 11 and another, municipally owned or contracted for, mainframe computer, a modem would be required. The modem must be compatible and have communication speed necessary to communicate with the mainframe computer (not shown).

Figure 2:
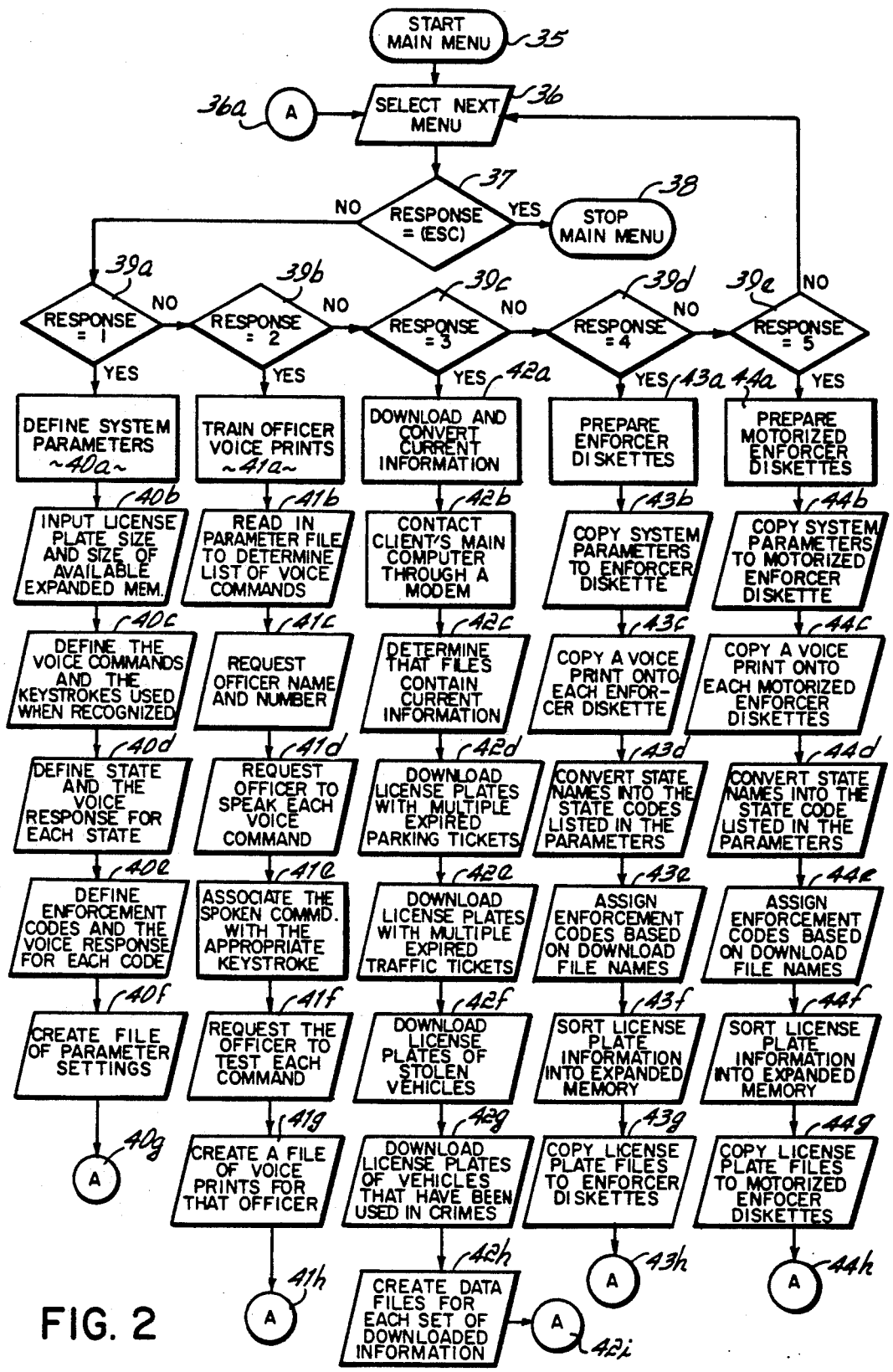
FIG. 2 is a functional flowchart depicting steps carried out at a base station computer in accordance with a preferred embodiment of the invention.

If more than 250,000 enforceable license plates are to be stored in the data file, and if the stand-alone computers 12 are to be used only in a stationary environment, it would be preferable to have the base station computer 11 communicate license plate information directly to each stand-alone computer 12 through any compatible Local Area Network (LAN) as is well known. FIG. 2 shows stand-alone computer 12a directly connected to base station computer 11 by a cable 30, as part of a Local Area Network. The base station computer 11 for a client wishing to utilize a LAN would further require LAN controller cards, cabling, and additional software.

The stand-alone computers 12 must be compatible with the base station computer 11. While any one of a number of commercially available computers may be utilized to implement this inventive system 10 and method, applicant suggests an IBM XT or AT compatible personal computer running MS-DOS 3.0 (or greater) with 640 K of RAM memory, and two 3.5 inch 1.44 megabyte floppy disk drives. No hard disk, display monitor, keyboard or printer is needed for the stationary stand-alone computer 12a. However, the display 25 is necessary for the mobile stand-alone computer 12b. If the client uses a trunked radio configuration to communicate with speech recognition circuitry 27, it will be necessary to use two TI-Speech Boards in each stand-alone computer 12.

Each stand-alone computer 12 should also include an expanded memory computer card that is compatible with the Lotus/Intel/Microsoft Expanded Memory Specification Version 4.0. This card must then have enough memory chips added to store all license plate records. An example of this type of computer card is the Intel Above Board Plus memory expansion card. Multiple expansion cards will be necessary if more than 600,000 license plates are on file.

The hand-held unit 13a may be any 800 MHz FM portable radio system that provides a clear channel capability, such as a Johnson CLEARCHANNEL LTR. Each system will have an additional radio transreceiver connected to the TI-Speech Speech Board to allow communication directly from the officer to stand-alone computer 12a. A Trunked Radio system can also be accommodated. An example of such a system is the Johnson Clearchannel Logic Trunked Radio system.

Figure 3:
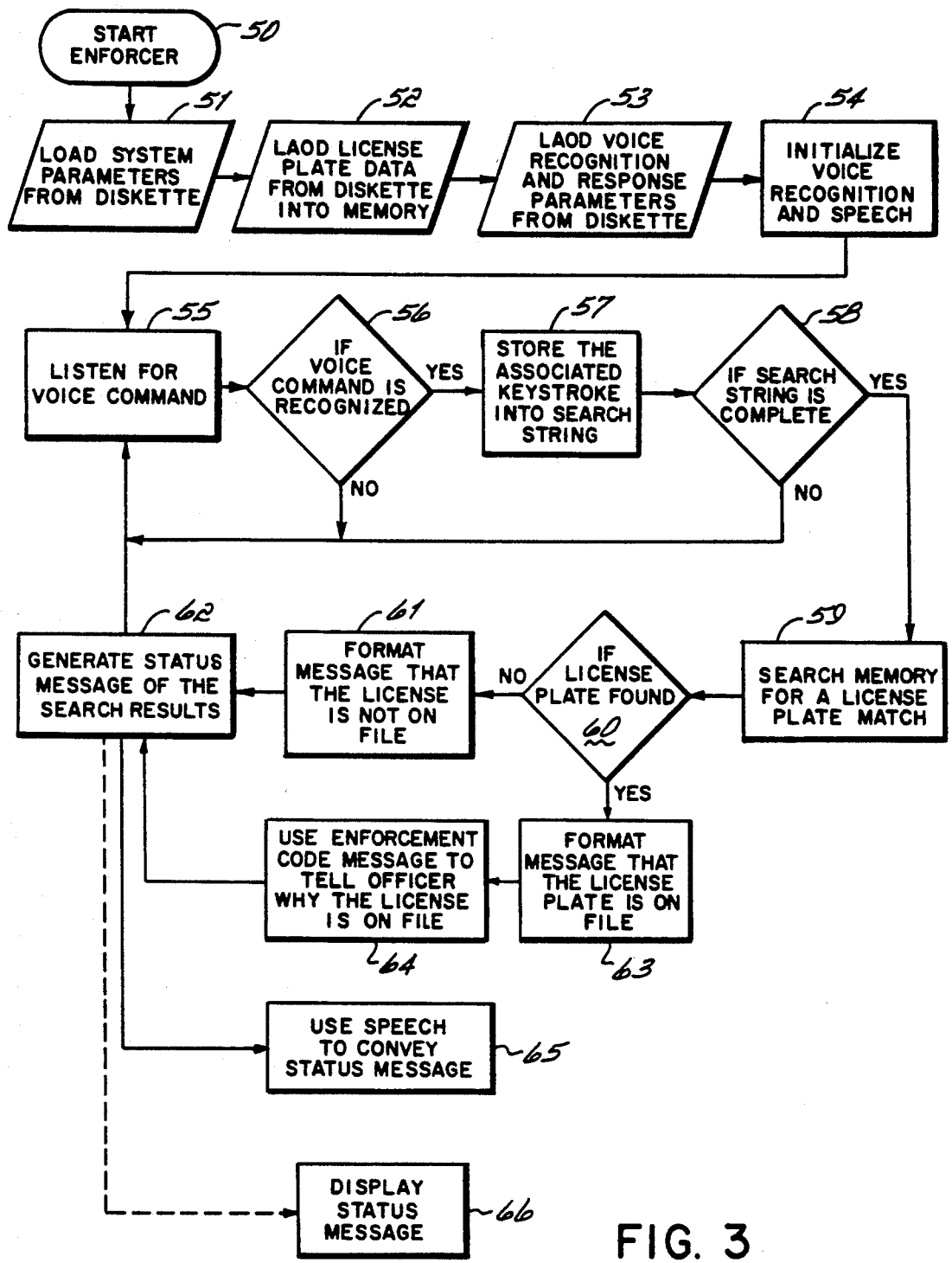
FIG. 3 is a functional flowchart depicting steps carried out by one of the stand-alone computers in accordance with a preferred embodiment of the invention.

FIGS. 2 and 3 show preferred sequences of operation in initiating speech recognition into the system 10, and utilization of speech recognition in the field for enforcement, respectively.

The first step in using this system 10 is to set the system parameters. The base station computer is initiated as shown in steps 35–39a and 40a–40g of FIG. 2 with the following information.

The maximum length of a license plate.

The size of expanded memory available in the stand-alone computer 12.

The number of voice commands which will be entered into the speech recognition circuitry 27 by each officer.

The keystroke or alphanumeric character entered by the stand-alone computer 12 when a voice command is recognized.

The maximum number of states or provinces that will be found on the files of downloaded license plates.

The state codes assigned for each state or province and the voiced word associated with each code.

The number of enforcement codes to be used or recognized by the stand-alone computers 12.

The unpaid violation code or enforcement code assigned to each type of enforcement situation (e.g., a code of 2 would mean that the license has been stolen, etc . . . ).

The response generated by a stand-alone computer 12 when an enforcement code is identified.

These parameters will be stored in a system parameters portion of the data file on base station computer 11. The file will be copied to a hard disk on base station computer 11. These parameters will then be copied to a diskette as shown in steps 43a–43h and 44a–44h of FIG. 2 for transfer to stand-alone computers 12 for use during operation.

Each officer 14 who will use the system 10 must first train the base station computer to recognize their voice, or enroll in the system 10 as shown in steps 41a–41h of FIG. 2. As many as 50 voice commands can be used to communicate with the data file in the stand-alone computer 12. Each command can be set by the user in the system parameters. An example of 39 voice commands that would prove useful are as follows:

| Voice Command | Associated Keystroke |
| --- | --- |
| Aztec | A |
| Bravo | B |
| Charlie | C |
| Delta | D |
| Echo | E |
| Foxtrot | F |
| Golf | G |
| Hotel | H |
| India | I |
| Juliette | J |
| Kilo | K |
| Lima | L |
| Mike | M |
| November | N |
| Oscar | O |
| Paul | P |
| Quebec | Q |
| Rebel | R |
| Sierra | S |
| Tango | T |
| Uniform | U |
| Victor | V |
| Whiskey | W |
| X-ray | X |
| Yankee | Y |
| Zulu | Z |
| One | 1 |
| Two | 2 |
| Three | 3 |
| Four | 4 |
| Five | 5 |
| Six | 6 |
| Seven | 7 |
| Eight | 8 |
| Nine | 9 |
| Zero | 0 |
| Enter | Start Search |
| Clear | Clear prior letters |
| Repeat | Repeat the search of the last license entered |

The base station computer 11 will prompt each officer to speak the voice commands. The computer 11 will then ask the officer 14 to test each of the commands to make sure that all of the commands work properly. The "voice prints" of each officer will then be saved on a hard disk at the base station computer 11. Prior to commencement of a new shift, this "voice print" may then be copied to a diskette for transfer to a stand-alone computer 12 associated with the beat duty to which that particular officer has been assigned.

This system 10 allows for the search of license plate numbers which are enforceable or are otherwise of interest. The system 10 requires storage of three separate files. The first file contains the system parameters entered at the base station computer 11. The second file contains the "voice prints" of the individual officer. The third file is a data file which contains a list of license plate information in ten byte records. The default record layout is as follows:

| Byte 1-8 | License Plate Number |
| Byte 9 | State or Province Code |
| Byte 10 | Enforcement Code |

If the client wishes to set the maximum license plate size in the system parameters to seven bytes instead of eight bytes, the license plate information or data file will automatically be formatted in nine byte records. The data file is sorted in alphabetical order by the base station computer 11 to allow the stand-alone computer 12 to search more efficiently.

FIG. 3 depicts steps 50-66 for using the stand along computer 12 at the beginning of each shift.

Each day, an officer 14 obtains a diskette containing an updated data file from the base station computer 11. The diskette is then inserted into the respective stand-alone computer 12 before turning the computer on. When the stand-alone computer 12 is first started, the system parameters are initialized, voice recognition and speech response is activated and the entire data file is loaded into the expanded memory from the diskette created at the base station computer 11. A typical personal computer with expanded memory can hold over 3.3 million ten byte license plate records.

The stand-alone computer 12 allows the officer to enter a license plate number one character at a time. The officer 14 will speak each character's key word through a radio transmitter. The voice recognition circuitry 27 will convert the spoken word into the appropriate keystroke and enter this keystroke to the stand-alone computer 12 if the officer's 14 voice is recognized. After speaking all letters and numbers of a license plate, the officer 14 will speak the voice command "ENTER". The stand-alone computer 12 will then search the data file stored in expanded memory for a license plate that matches the keystrokes received.

If no match is found, the stand-alone computer 12 will generate a speech response informing the officer 14 that the license plate was not in the data file. If a match is found, the stand-alone computer will continue to search to check if additional license plates are in the data file, i.e., those having the same alphanumeric string, but from a different state or province. After all license plates have been found the enforcer system will generate a speech response corresponding to whatever was located in the data file. If stationary, the stand-alone computer 12 will then transmit a speech response informing the officer that the license plate was on file, which states were found for that license plate, and what enforcement messages were found for that license plate. If mobile, an audible signal will indicate the location of some stored enforcement information. The officer 14b then looks at the display 25 to identify the code.

The following example illustrates this point. An officer 14 begins to write a parking ticket for a vehicle with a license plate number of EPK911 from the state of Tennessee. The officer 14 communicates to the stand-alone computer 12 through a radio with the following voice commands: "ECHO PAUL KILO NINE ONE ONE ENTER". The speech recognition circuitry 27 converts these voice commands to the keystrokes EPK911 and begins the search through the data file for license plates in expanded memory. If no license plate is found, the computer 12 generates the following speech message and broadcasts it through the hand-held unit 13 to the officer 14:

"License plate echo paul kilo nine one one is not on file"

If a match is found, the state code and enforcement code for the license plate is retrieved from the data file in expanded memory and a speech message is generated. For example, if this license number from Tennessee should be enforced, the following speech message would be generated: "License plate echo paul kilo nine one one from Tennessee should be enforced".

If multiple matches are found, all state codes and enforcement codes are retrieved from expanded memory and used to generate a speech message. The following message could result: "License plate echo paul kilo nine one one."

"from Arkansas is stolen"

"from Mississippi has been used in a felony"

"from Tennessee should be enforced." The officer 14 will hear the speech message received on the radio and determine what enforcement action should be taken for the license plate being ticketed.

When used in a mobile environment, no radio communication is necessary because the stand-alone computer 12b is located in the vehicle 21. In addition, no computer generated voice response is necessary because the officer can view information on the screen of the display 25. The mobile officer is typically dedicated full-time to enforcement. This officer 14 does not write parking tickets, but rather checks the enforcement status of all observed vehicles. This officer 14 slowly drives the streets and parking lots of high density parking locations and checks the enforcement status of every vehicle encountered. The officer 14 must enter voice commands and receive notification of enforcement status in just a few seconds.

The major difference between the stationary environment and the mobile environment is that no radio-communication is necessary between officer 14 and stand-alone computer 12b. Officer 14 speaks into microphone 13b which is directly connected to voice recognition circuitry 27. Another difference between the stationary environment and the mobile environment is the response received from the stand-alone computer 12b after the license plate search is complete. In the mobile system, the computer 12b quickly sounds tones on its internal speaker and displays the results of the search on the computer's screen. The tones alert the officer as to the results of the computer search, and a violation tone informs the officer 14b to view the display 25. This method of notification is faster than a speech message and will allow the officer 14b to continue operating the vehicle 21 while only occasionally being required to look at the display 25, and only for a brief moment.

As an option, the stand-alone computer 12b can be programmed to display the dollar amount of all past due fines for a license plate that should be enforced. This would allow an officer 14b to boot the violators vehicle on the spot and write a notice informing the violator of the total amount of monies to be paid before the boot could be removed.

A modem (not shown) at the base station computer 11 may be used to contact the city's mainframe computer (not shown). Files on the mainframe computer containing multiple expired parking ticket violators, multiple expired moving violations, stolen vehicles, and vehicles used in a felony may be individually accessed and copied to the data file on the hard disk of the base station computer 11 as shown in steps 42a-42i of FIG. 2. The downloaded license plate information may now be loaded into the expanded memory of the base station computer 11. As the data is loaded, an enforcement code is appended to each license plate based on the file from which the data is loaded. For example, license plate data loaded from the multiple expired violators file could be assigned an enforcement code of 1. The license plates from the stolen vehicle file could have an enforcement code of 2, and so on.

The data stored in expanded memory is also sorted into alphabetical order resulting in one large combined, sorted file containing all license plates that need to be enforced or are otherwise of interest to the client. This data is then saved to the base station computer's 11 hard disk. This information will be transferred to the stand-alone computer 12 by diskette. The various software programs necessary for implementing this inventive system 10 and method are appended hereto.

While I have described a preferred embodiment of the parking ticket enforcement system of this invention, it is to be understood that the invention is not limited thereby and that in light of the present disclosure of the invention, various other alternative embodiments will be apparent to a person skilled in the art. Accordingly, it is to be understood that changes may be made without departing from the scope of the invention as particularly set forth and claimed.

I claim:

1. A parking ticket enforcement system comprising:
   a base station computer with memory means for storing a data file of a selected group of license plate numbers and coded violation information associated with each of said numbers;
   at least one stand-alone computer with memory means for storing the data file of license plate members and coded violation information, the stand-alone computer being compatible with said base station computer for periodic transfer of said data file therebetween, the system including one stand-alone computer for each of a plurality of officers on duty;
   a portable unit associated with each said stand-alone computer, the unit assigned to an officer on duty; and
   each stand-alone computer including voice recognition means for receiving and recognizing a voiced message from said officer regarding an observed license plate number, said stand-alone computer adapted to compare said recognized number with said data file stored in the memory means of the stand-alone computer and in response thereto, to generate a status message related to coded violation information containing said data file stored in the memory of the stand-alone computer and associated with the observed license plate number, wherein said officer obtains the violation information via real-time interaction between the respective portable unit and the stand-alone computer while on duty and via interaction between the base station and the stand-alone computer prior to duty.

2. The parking ticket enforcement system of claim 1 wherein the hand-held unit is a transceiver and each said stand-alone computer includes transmitting means for transmitting said status message to the respective transceiver.

3. The parking ticket enforcement system of claim 2 wherein said transceiver further comprises:
   means for converting said received status message into an audible signal.

4. A method of enforcing parking tickets comprising the steps of:
   maintaining in memory means at a base station computer a data file representative of a select group of vehicle license plate numbers and coded violation information associated with each of said numbers;
   transferring, prior to an enforcement duty time period, said data file from said base computer to at least one stand-alone computer with memory means capable of storing said data file therein;
   transmitting by voice an observed license plate number from a hand-held unit to the respective stand-alone computer;
   receiving and recognizing said voiced transmission at the respective stand-alone computer and comparing said observed number with said data file stored in said stand-alone computer to generate a status message corresponding to coded violation information stored therein associated with said observed license plate number, whereby said coded violation information is received at the hand-held unit via real-time interaction between the hand-held unit and the respective stand-alone computer during said enforcement duty time period based upon interaction between the stand alone computer and the base station prior to said enforcement duty time period; and
   updating the data file at the base station after the duty time period.

5. The method of claim 4 and further comprising the step of:
   transmitting said generated status message to the respective hand-held unit.

6. The method of claim 5 and further comprising the step of:
   converting said received status message into an audible signal at said hand-held unit.

7. The method of claim 4 and further comprising the steps of:
   transmitting by voice from the hand-held unit to the respective stand-alone computer an observed vehicle license plate number and an observed violation code associated therewith;
   receiving, recognizing and storing said transmitted number and code at said stand-alone computer; and
   subsequently transferring said observed, received, recognized, and stored number and code from said stand-alone computer to said base station, thereby to periodically update said data file at said base station.

8. The method of claim 7 and further comprising the steps of:
   periodically updating said base station data file from a plurality of stand-alone computers to provide cumulative updating of said base station data file;
   subsequently transferring said cumulatively updated base station data file to a plurality of stand-alone computers, thereby to disseminate said cumulatively updated data file to officers on duty.

9. The method of claim 4 wherein the updating step is performed by transferring updated violation information accumulated during the duty time period from the memory means of the stand-alone computer back to the base station.

10. A method of enforcing parking ticket comprising the steps of:
   maintaining in memory means of a base station computer a data file representative of a select group of vehicle license plate numbers and coded violation information associated with each of said numbers;
   transferring, prior to the beginning of a duty shift, said data file from said base station computer to memory means of at least one stand-alone computer capable of storing said data file therein;
   communicating to one of said stand-alone computers a voiced signal relates to a license plate number observed by an officer during the duty shift;
   generating at the respective stand-alone computer, in response to recognition of said voiced signal, a status message corresponding to coded violation information stored in and retrieved from said memory means of the stand-alone computer and associated with the observed license plate number;
   audibly communicating said status message retrieved from said memory means at said stand-alone computer to said officer, thereby to enable the officer to take appropriate enforcement action, whereby the officer obtains the coded violation information via real-time interaction with the stand-alone computer during the duty shift based upon interaction with the base station prior to the duty shift; and
   updating the data file at the base station after the duty shift.

11. A method of enforcing parking tickets comprising the steps of:
   maintaining in memory means of a base station computer a data file representative of a select group of vehicle license plate numbers and coded violation information associated with each of said numbers;
   transferring, prior to an officer's serving of a duty shift, said data file from said base station computer to memory means of at least one stand-alone computer capable of storing said data file therein;
   communicating to one of said stand-alone computers a voiced signal related to a license plate number observed by an officer during the duty shift;
   generating at the respective stand-alone computer, in response to recognition of said voiced signal, a status message corresponding to coded violation information stored in and retrieved from said memory means of the stand-alone computer and associated with the observed license plate number;
   displaying, at said stand-alone computer, said status message retrieved from said memory means of said stand-alone computer, thereby to enable the officer to take appropriate enforcement action, whereby the officer obtains the coded violation information via real-time interaction with the respective stand-alone computer during the duty shift based upon interaction with the base station prior to the duty shift; and
   updating the data file at the base station after the duty shift.

* * * * *

UNITED STATES PATENT AND TRADEMARK OFFICE
CERTIFICATE OF CORRECTION

PATENT NO. : 5,263,118
DATED : November 16, 1993
INVENTOR(S) : Brian Cornelison It is certified that error appears in the above-identified patent and that said Letters Patent is hereby corrected as shown below:

Column 5, line 60, "base station computer is" should read --base station computer 11 is--.

Column 10, line 3, "containing" should read --contained in--.

Column 11, line 28, "relates" should read --related--.

Signed and Sealed this

Eighth Day of August, 1995

*Attest:*

BRUCE LEHMAN

*Attesting Officer*  *Commissioner of Patents and Trademarks*